United States Patent
Isobe et al.

(10) Patent No.: US 8,356,623 B2
(45) Date of Patent: Jan. 22, 2013

(54) MASS FLOW METER AND MASS FLOW CONTROLLER

(75) Inventors: Yasuhiro Isobe, Kyoto (JP); Osamu Horinouchi, Otsu (JP); Yuki Tanaka, Kyoto (JP); Masao Yamaguchi, Kyoto (JP); Yukimasa Furukawa, Kusatsu (JP)

(73) Assignee: Horiba STEC, Co., Ltd., Kyoto-shi (JP)

(*) Notice: Subject to any disclaimer, the term of this patent is extended or adjusted under 35 U.S.C. 154(b) by 331 days.

(21) Appl. No.: 12/625,366

(22) Filed: Nov. 24, 2009

(65) Prior Publication Data

US 2010/0163119 A1   Jul. 1, 2010

(30) Foreign Application Priority Data

Dec. 25, 2008 (JP) ................................ 2008-331541
Nov. 19, 2009 (JP) ................................ 2009-264271

(51) Int. Cl.
*F16K 31/00* (2006.01)
(52) U.S. Cl. .................. 137/486; 137/487.5; 73/204.25; 73/202
(58) Field of Classification Search ............... 137/487.5, 137/486, 488, 468; 73/202, 204.25
See application file for complete search history.

(56) References Cited

U.S. PATENT DOCUMENTS

| | | | | |
|---|---|---|---|---|
| 5,062,446 A * | 11/1991 | Anderson | | 137/468 |
| 5,439,026 A * | 8/1995 | Moriya et al. | | 137/486 |
| 5,865,205 A * | 2/1999 | Wilmer | | 137/2 |
| 5,911,238 A * | 6/1999 | Bump et al. | | 137/487.5 |
| 6,360,772 B1 * | 3/2002 | Wu | | 137/486 |
| 6,389,364 B1 * | 5/2002 | Vyers | | 702/45 |
| 6,655,408 B2 * | 12/2003 | Linthorst | | 137/487.5 |
| 6,948,508 B2 * | 9/2005 | Shajii et al. | | 137/1 |
| 7,140,384 B2 * | 11/2006 | Kang et al. | | 137/487.5 |
| 7,273,063 B2 * | 9/2007 | Lull et al. | | 137/12 |
| 7,380,564 B2 * | 6/2008 | Lull et al. | | 137/1 |
| 7,409,871 B2 * | 8/2008 | Wang et al. | | 73/861.01 |
| 7,467,027 B2 * | 12/2008 | Ding et al. | | 700/282 |
| 7,510,884 B2 * | 3/2009 | Okabe et al. | | 438/11 |
| 7,826,986 B2 * | 11/2010 | McDonald | | 702/45 |
| 8,036,780 B2 * | 10/2011 | Gotoh | | 700/282 |
| 2004/0123657 A1 * | 7/2004 | Kim et al. | | 73/204.21 |
| 2006/0037644 A1 | 2/2006 | Nishikawa et al. | | |
| 2006/0124173 A1 * | 6/2006 | An | | 137/487.5 |
| 2010/0000608 A1 * | 1/2010 | Goto et al. | | 137/2 |
| 2011/0048551 A1 * | 3/2011 | Tanaka et al. | | 137/486 |

FOREIGN PATENT DOCUMENTS

| | | |
|---|---|---|
| CN | 1643466 A | 7/2005 |
| CN | 1688839 A | 11/2005 |
| JP | 07-271447 | 10/1995 |
| JP | 2004093179 A | 3/2004 |

(Continued)

*Primary Examiner* — John Rivell
*Assistant Examiner* — Minh Le
(74) *Attorney, Agent, or Firm* — Alleman Hall McCoy Russell & Tuttle LLP

(57) ABSTRACT

In order to improve a measurement accuracy of a mass flow meter, the mass flow meter comprises a flow rate calculating section that obtains an output signal from a sensor section having a thermosensitive resistive element arranged in a flow channel where a sample gas flows and that calculates a flow rate of the sample gas, a pressure measuring section that measures a primary side pressure in the flow channel, and a flow rate correcting section that corrects the measured flow rate obtained by the flow rate calculating section by the use of the primary side pressure obtained by the pressure measuring section and a gas coefficient determined by an isobaric specific heat of the sample gas.

6 Claims, 11 Drawing Sheets

FOREIGN PATENT DOCUMENTS

| | | |
|---|---|---|
| JP | 2007058635 A | 3/2007 |
| WO | 2004020956 A2 | 3/2004 |
| WO | 2007086960 A1 | 8/2007 |
| WO | 2007138941 A1 | 12/2007 |

* cited by examiner

MASS FLOW METER AND MASS FLOW CONTROLLER

FIELD OF THE ART

This invention relates to a flow rate sensor, especially to a flow rate sensor that can conduct a measurement of the flow rate for each sample gas at high accuracy.

BACKGROUND ART

One kind of a mass flow meter that is known is a thermal mass flow meter comprising a main flow channel where a sample gas flows, a sensor flow channel that divides the sample gas by being bifurcated from the main flow channel and that is provided with a flow rate detecting mechanism to detect a mass flow rate of the sample gas and a bypass flow channel that is arranged between a bifurcating point and a meeting point in the sensor flow channel. This kind of the thermal mass flow meter has a flow rate detecting mechanism comprising an upstream side sensor section and a downstream side sensor section each being formed by winding two thermosensitive resistive bodies in a shape of a coil around an outer side of a hollow narrow pipe made of metal forming the sensor flow channel and a bridge circuit arranged for each sensor section.

More concretely, the hollow narrow pipe is heated by the thermosensitive resistive bodies and a temperature distribution is symmetric to an axis of a center of the hollow narrow pipe while the sample gas does not flow. Meanwhile, the temperature at the downstream side sensor section becomes higher than the temperature at the upstream side sensor because the sample gas heated by the upstream side sensor flows into the downstream side sensor section while the sample gas flows so that the temperature difference is formed between the upstream side sensor section and the downstream side sensor. As a result, the temperature distribution becomes asymmetric.

Since a certain relationship is formed between the temperature difference ($\Delta T$) and the mass flow rate of the sample gas, the mass flow rate can be measured by detecting the temperature difference by means of the bridge circuit (for example, refer to the patent document 1).

However, the above-mentioned mass flow meter has a problem that the measurement accuracy of the flow rate drops because of the error in the measured flow rate in a case where the gas supply pressure (primary side pressure) is changed (for example, 100 kPa) in the main flow channel where the mass flow meter is arranged.

In addition, there is a problem that the error of the measured flow rate resulting from the change of the primary side pressure varies depending on a kind of the sample gas.

Patent document 1: Japan patent laid-open number 7-271447

DISCLOSURE OF THE INVENTION

Problems to be Solved by the Invention

In order to solve all of the problems, the present claimed invention is based on an unprecedented new idea that the measured flow rate is corrected not only by the use of the primary side pressure but also by the use of a coefficient determined by a kind of the sample gas.

Means to Solve the Problems

More specifically, a mass flow meter in accordance with this invention is characterized by comprising a flow rate calculating section that obtains an output signal from a sensor section having a thermosensitive resistive element arranged in a flow channel where a sample gas flows and that calculates a measured flow rate of the sample gas, a pressure measuring section that measures a primary side pressure in the flow channel, and a flow rate correcting section that corrects the measured flow rate obtained by the flow rate calculating section by the use of the primary side pressure obtained by the pressure measuring section and a gas coefficient determined by the sample gas.

In accordance with this invention, since it is possible not only to decrease a measurement error of the flow rate resulting from a change of the primary side pressure as much as possible but also to correct the measured flow rate with the gas coefficient determined by the sample gas, the measurement accuracy of the flow rate of the mass flow meter can be improved.

In a case where the primary side pressure is changed, in order to improve the measurement accuracy of the flow rate by correcting a measurement error of the flow rate resulting from the primary side pressure in a state where the changed primary side pressure is stabilized, it is preferable that the flow rate correcting section corrects the measured flow rate obtained by the flow rate calculating section by the use of the primary side pressure obtained by the pressure measuring section.

In order both to simplify the correction of the measured flow rate and to decrease an arithmetic processing amount as much as possible, it is preferable that the flow rate correcting section calculates a corrected flow rate $Q_{offset}$ based on the following linear expression, where the primary side pressure is set as $P_{in}$, the previously set reference pressure as $P_{base}$, the gas coefficient as $\alpha$, and the measured flow rate as Q.

$$Q_{offset} = Q_{raw} \times \{1 - (P_{base} - P_{in}) \times \alpha\} \qquad [\text{Expression 1}]$$

In addition, the flow rate correcting section may calculate the corrected flow rate $Q_{offset}$ based on the following expression.

$$Q_{offset} = Q_{raw} \times \left[1 - \left\{(a \times Q_{raw} + b) \times \frac{P_{in} - P_{base}}{P_{in(0)} - P_{base}}\right\}\right] \qquad [\text{Expression 2}]$$

where $P_{in}$ is a primary side pressure, $P_{base}$ is a previously set reference pressure, each constant a, b is a value determined by a gas physicality value of the sample gas and the primary side pressure, and the $P_{in(0)}$ is a primary side pressure at a time when the constant a and the constant b are obtained.

Furthermore, in order to make it possible to control the flow rate with high accuracy by the use of the above-mentioned mass flow meter, it is characterized by comprising the above-mentioned mass flow meter, a flow rate control valve arranged in the flow channel, and a valve controlling section that controls a valve open degree of the flow rate control valve based on the corrected measured flow rate value obtained by the mass flow meter and a set flow rate value as being a target flow rate.

Effect of the Invention

In accordance with this invention having the above arrangement, since it is possible not only to decrease a measurement error of the flow rate resulting from a change of the primary side pressure as much as possible but also to correct the measured flow rate with the gas coefficient determined for each sample gas, the measurement accuracy of the flow rate of the mass flow meter can be improved.

BEST MODES OF EMBODYING THE INVENTION

First Embodiment

Figure 1:
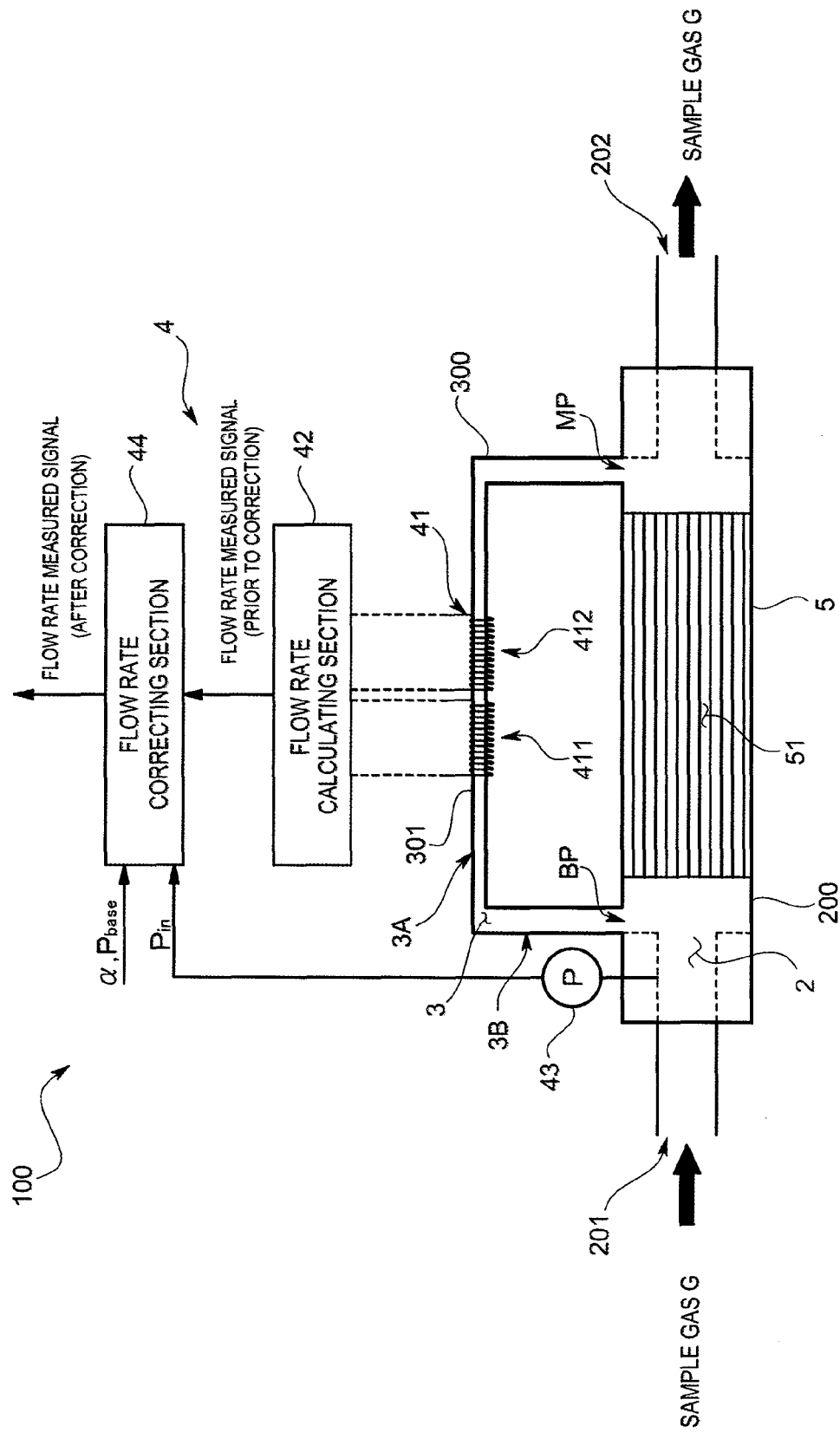
FIG. 1 is a pattern configuration diagram of a mass flow meter in accordance with a first embodiment of this invention.

A first embodiment of a mass flow meter 100 in accordance with this invention will be explained with reference to drawings. FIG. 1 is a pattern configuration diagram showing the mass flow meter 100 in accordance with this embodiment.
<Configuration>

The mass flow meter 100 in accordance with this embodiment is a thermal mass flow meter and comprises a main flow channel 2 where a sample gas G that is a fluid (for example, a gas for processing a semiconductor such as $SF_6$) flows, a sensor flow channel 3 that bifurcates from the main flow channel 2 and divides the sample gas G so as to detect a flow rate $Q_{raw}$ of the sample gas G, a flow rate detecting mechanism 4 that detects the flow rate $Q_{raw}$ of the sample gas G, and a laminar flow element 5 that is arranged between a bifurcating point BP and a meeting point MP of the sensor flow channel 3 in the main flow channel 2 and that has multiple internal flow channels 51.

Each section 2~5 will be explained.

The main flow channel 2 is formed by a main pipe section 200 in a shape of a generally straight pipe having a fluid inlet 201 and a fluid outlet 202. A shape of the main pipe section 200 may be a shape of a bent pipe having the fluid inlet 201 and the fluid outlet 202 as long as a portion forming a flow channel including the bifurcating point BP and the meeting point MP is in a shape of a straight pipe.

The sensor flow channel 3 is formed by a hollow narrow pipe of a shape of a generally inverted "U" character arranged to stand on the main pipe section 200. The hollow narrow pipe 300 of this embodiment is made of stainless steel, however, it may be made of other material.

The sensor flow channel 3 comprises a measuring channel 3A on which the flow rate detecting mechanism 4 for detecting the $Q_{raw}$ of the sample gas G flowing in the main flow channel 2 is arranged and a connecting channel 3B that connects the main flow channel 2 and the measuring channel 3A.

The measuring channel 3A is arranged generally in parallel to the main flow channel 2 and the connecting channel 3B is arranged generally orthogonal to the main flow channel 2. Briefly, the connecting channel 3B is arranged generally orthogonal to the measuring channel 3A.

The laminar flow element 5 is arranged between the bifurcating point BP and the meeting point MP of the sensor flow channel 3 in the main flow channel 2. The laminar flow element 5 is to set a diversion ratio of the main flow channel 2 and the sensor flow channel 3 at a predetermined designed value. The diversion ratio is a ratio of a flow rate in the flow channel between the bifurcating point BP and the meeting point MP in the main flow channel 2 to a flow rate in the sensor flow channel 3. More concretely, the laminar flow element 5 consists of a resistive member such as a bypass element having a characteristic of a constant flow rate. And the internal flow channel 51 is arranged to be generally parallel to a direction of the main flow channel 2. The laminar flow element 5 may be formed by inserting multiple narrow pipes into an inside of an outer pipe or by stacking multiple thin circular plates where multiple through bores are formed.

The flow rate detecting mechanism 4 comprises a sensor section 41 that detects a flow rate diverted into the sensor flow channel 3 and a flow rate calculating section 42 that obtains an output signal from the sensor section 41 and that calculates a flow rate $Q_{raw}$ of the sample gas G flowing in the main flow channel 2.

Figure 2:
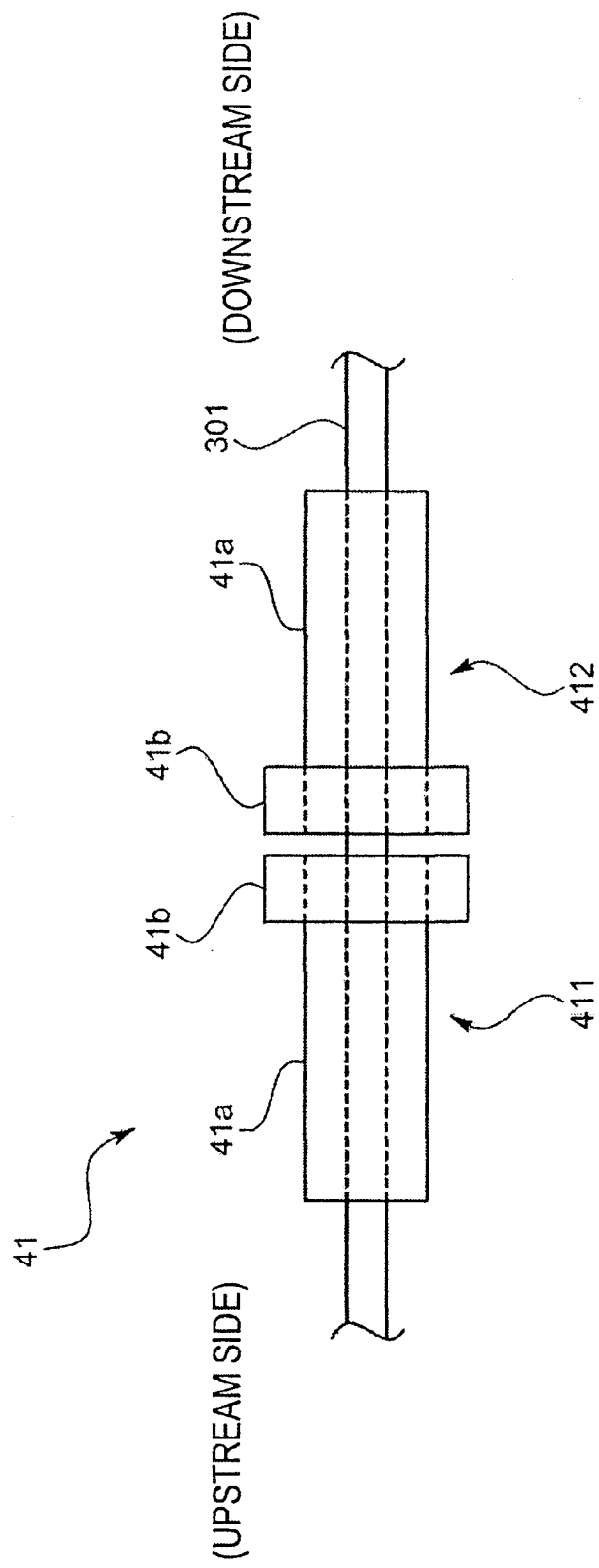
FIG. 2 is a view showing an outline of a sensor section in accordance with this embodiment.

The sensor section 41 comprises, especially as shown in FIG. 2, an upstream side sensor section 411 arranged in an upstream side of the measuring channel 3A and a downstream side sensor section 412 arranged in a downstream side of the measuring channel 3A.

Each of the upstream side sensor section 411 and the downstream side sensor section 412 is formed by winding a thermosensitive resistive element that increases or decreases the electric resistive value in accordance with a temperature change, and comprises a coiled first thermosensitive resistive element 41a winding around a straight pipe section 301 of the hollow narrow pipe 300 forming the measuring channel 3A and a coiled second thermosensitive resistive element 41b winding around an outer circumference of the first thermosensitive resistive element 41a. In this embodiment, in view of improving a sensor sensitivity by sharpening a peak of a temperature distribution appearing at a center of the hollow narrow pipe 300 without unnecessarily raising an average temperature of the whole of the hollow narrow pipe 300, the second thermosensitive resistive element 41b is arranged at an inside end section between each sensor section 411, 412. In addition, a winding width of the second thermosensitive resistive element 41b is set to be less than or equal to a half of a winding width of the first thermosensitive resistive element 41a. Both the upstream side sensor section 411 and the downstream side sensor section 412 are covered with an insulation material.

With this arrangement, it is possible to increase a temperature difference between the upstream side and the downstream side by sharpening a center peak that appears in the temperature distribution of the whole of the sensor sections 411, 412 at a time of detecting the temperature and to capture the temperature change with high sensitivity, the sensor sensitivity is improved. In addition, if the winding width of the first thermosensitive resistive element 41a is increased within a predetermined range, it is possible to increase a full scale by both enlarging the area where a linearity can be secured and supersensitizing the sensor also for the sample gas G whose area where the linearity can be secured is narrow so that the full scale is restricted due to its physicality like a low vapor pressure gas, thereby preferably enabling detection of the flow rate.

The flow rate calculating section 42 is electrically connected with the first and the second thermosensitive resistive elements 41a, 41b of the sensor section 411, 412, and calculates the flow rate in the sensor flow channel 3 (concretely, in the measuring channel 3A) by detecting a voltage value of the first and the second thermosensitive resistive elements 41a, 41b and also calculates the flow rate $Q_{raw}$ of the sample gas G in the main flow channel 2 based on the diversion ratio.

As a concrete arrangement, the flow rate calculating section 42 is formed by an electric circuit comprising a bridge circuit, an amplification circuit and a correction circuit (neither of which is shown in the drawings). The flow rate calculating section 42 detects an instant flow rate of the sample gas G as an electric signal (a voltage value) by means of the sensor sections 411, 412 and amplifies its electric signal by means of the electric circuit and then outputs the amplified electric signal as a sensor output signal (measured flow rate $Q_{raw}$) having a value according to the detected flow rate.

Then the flow rate detecting mechanism 4 of this embodiment has a function of correcting a drop of the flow rate measurement accuracy resulting from the primary side pressure $P_{in}$ at a time when the primary side pressure $P_{in}$ is changed in a case where the flow of the sample gas G is in a static state. The flow rate detecting mechanism 4 of this embodiment comprises a pressure measuring section 43 that measures the primary side pressure $P_{in}$ in the main flow channel 2 and a flow rate correcting section 44 that corrects the measured flow rate $Q_{raw}$ obtained by the flow rate calculating section 42 by the use of the primary side pressure $P_{in}$ obtained by the pressure measuring section 43 and the gas coefficient $\alpha$ determined by the sample gas G.

The pressure measuring section 43 is arranged at an upstream side of the bifurcating point BP of the sensor flow channel 3 to measure the primary side pressure $P_{in}$ of the sample gas G flowing in the main flow channel 2, and is, for example, a capacitance type pressure sensor that detects the pressure applied to a diaphragm as a change of a capacitance. The pressure measuring section 43 may use a strain gauge type sensor.

The flow rate correcting section 44 obtains the measuring flow rate signal from the flow rate calculating section 42 and corrects and calculates its measured flow rate $Q_{raw}$. Its configuration consists of a digital or an analog electric circuit such as a CPU, a memory, an AD converter or a buffer. The flow rate correcting section 44 corrects and calculates the measured flow rate $Q_{raw}$ based on the following expression (1) and outputs the corrected measured flow rate $Q_{offset}$ as an output signal at a time when the primary side pressure obtained by the pressure measuring section 43 is set as $P_{in}$, a previously set reference pressure is set as $P_{base}$, a gas coefficient determined based on the pressure dependency of the sample gas G is set as $\alpha$ and the measured flow rate obtained by the flow rate calculating section 42 is set as $Q_{raw}$. The flow rate correcting section 44 uses a signal value (a raw data that is not provided with any process such as a conversion or the like) output from the pressure measuring section 43.

[Expression 3]

$$Q_{offset} = Q_{raw} \times \{1 - (P_{base} - P_{in}) \times \alpha\} \quad (1)$$

where a primary side pressure $P_{in}$ is a primary side pressure in the main flow channel 2 in a state (a stable state) where the set flow rate flows in the main flow channel 2 at a constant pressure.

The reference pressure $P_{base}$ is a pressure (a gauge pressure in this embodiment) in the main flow channel 2 at a time when the set flow rate becomes equal to the flow rate in the main flow channel 2 calculated by the flow rate calculating section 42 in a state (stable state) where the set flow rate flows in the main flow channel 2 at a constant pressure. For example, in a case where a constant set flow rate of $SF_6$, which is the sample gas, is set at 350 [sccm], the reference pressure $P_{base}$ becomes 175 [kPag] in the main flow channel 2 at a time when the flow rate calculating section 42 calculates the flow rate in the main flow channel 2 at 350 [sccm]. The reference pressure $P_{base}$ is input in advance to the flow rate correcting section 44 by a user.

As mentioned, the flow rate correcting section 44 corrects not an error of the flow rate resulting from a transitional pressure change in the main flow channel 2 but an error of the flow rate resulting from a condition of the used primary side pressure $P_{in}$, namely, a flow rate error resulting from a difference between a state where the primary side pressure in the main flow channel 2 is the reference pressure $P_{base}$ and a state where the primary side pressure in the main flow channel 2 is different from the reference pressure $P_{base}$.

In addition, the gas coefficient $\alpha$ is determined based on the pressure dependence of the sample gas G and is inherent to the sample gas G, and is determined respectively in accordance with a kind of the sample gas G. The gas coefficient $\alpha$ is determined by, for example, an isobaric specific heat $C_p$ or a molar isobaric specific heat $C_p$ of the sample gas G. A method for determining the gas coefficient $\alpha$, may be to obtain the gas coefficient $\alpha$ for each sample gas G by an experiment (to be described later), or may be to obtain the gas coefficient $\alpha$ for one sample gas G by experiment, and then to calculate the gas coefficient $\alpha$ for other sample gas G by means of the calculation by the use of a ratio of an isobaric specific heat $C_p$ of the sample gas G. The gas coefficient $\alpha$ is also input to the flow rate correcting section 44 in advance by the user. At this time, each gas coefficient $\alpha$ for several kinds of the sample gas G may be input so as to be a data base of the mass flow meter 100.

Figure 3:
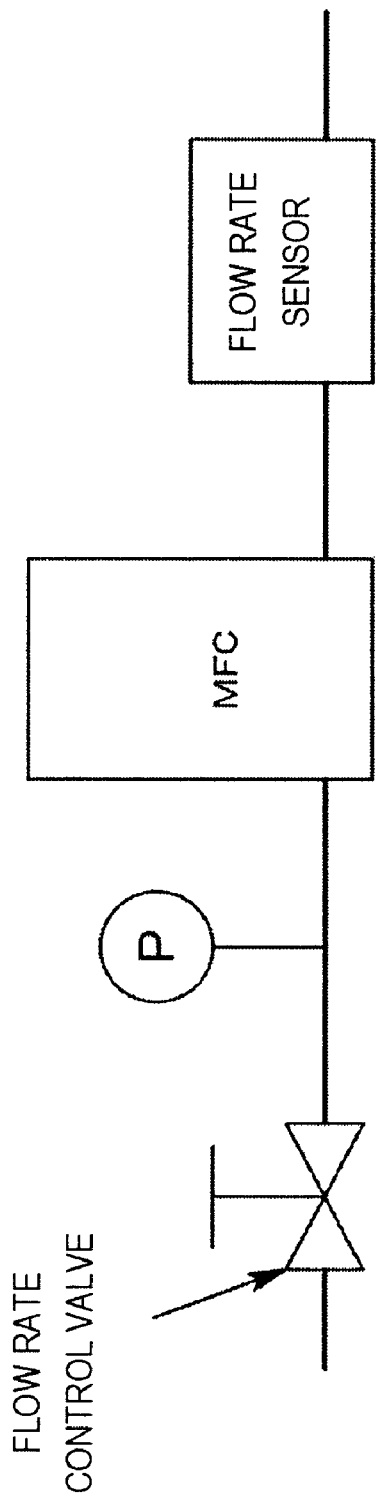
FIG. 3 is a view showing an experimental example to determine a gas coefficient α.

A method for determining the gas coefficient $\alpha$ will be explained with reference to FIG. 3. In FIG. 3, the flow rate control valve, the pressure sensor, the mass flow controller (MFC) and the flow rate sensor are arranged in this order from the upstream side in the flow channel.

With this arrangement, a flow rate coming from the MFC whose target flow rate is set is measured by the flow rate sensor at a time when the primary side pressure of the MFC is changed by 10 [kPag] between 50 [kPag] and 300 [kPag]. Next, a relationship between the primary side pressure and the measured flow rate (an actual flow rate) of the flow rate sensor is obtained by an approximate expression. Then a changed amount from an output of the flow rate sensor at a time of the reference pressure $P_{base}$ determined in advance based on the approximate expression to an output of the flow rate sensor at a time of another pressure is set as the gas coefficient $\alpha$. With this procedure, the gas coefficient $\alpha$ that is specific to a kind of the gas and a set flow rate is determined. With the above procedures, the gas coefficient $\alpha$ is determined for every kind of gas and every set flow rate.

Figure 4:
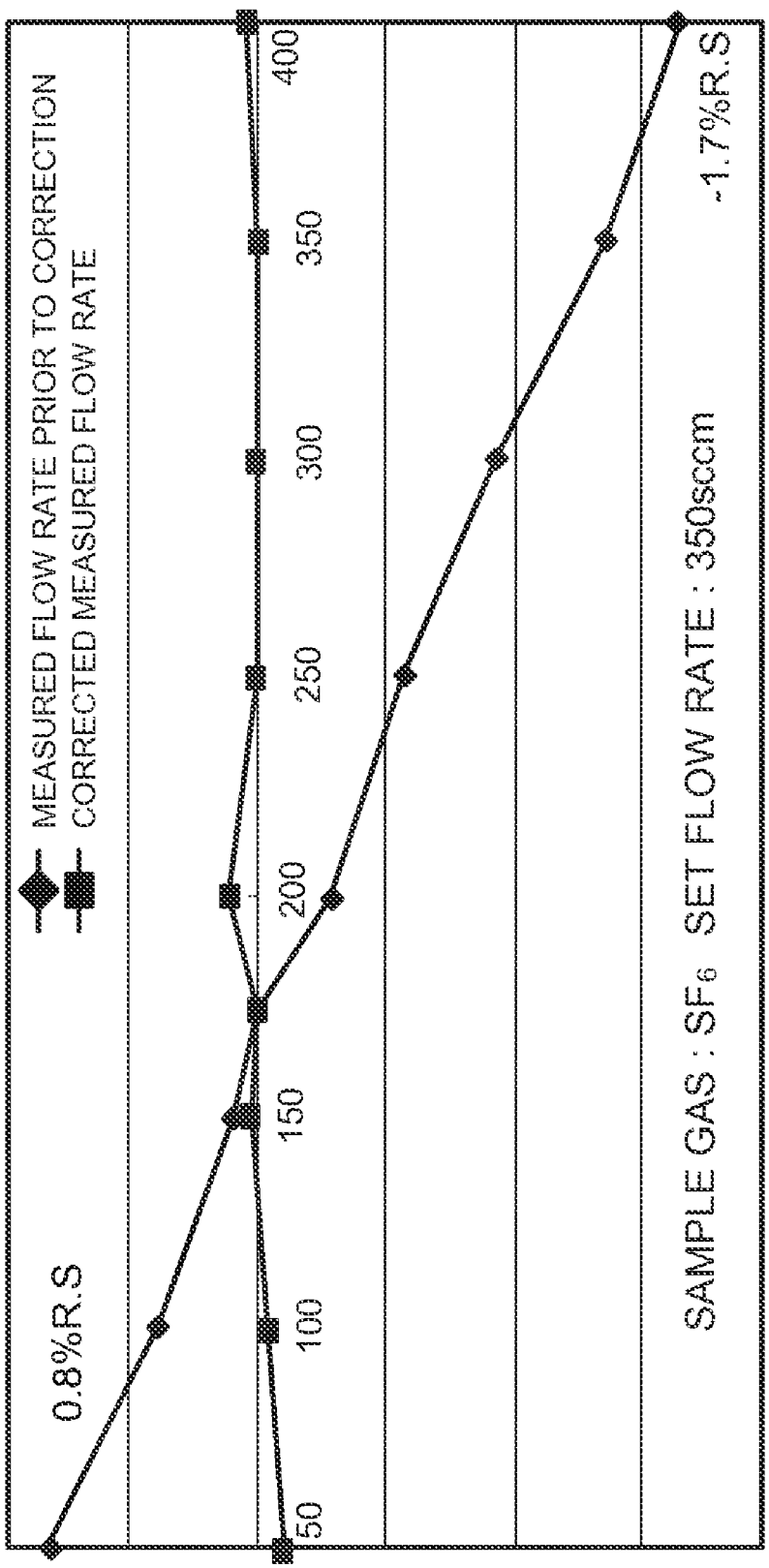
FIG. 4 is a view showing a measured flow rate prior to correction and a corrected measured flow rate.

A comparison result between a case where the flow rate correction is conducted by the flow rate correcting section 44 and a case where no correction is conducted will be shown in FIG. 4. FIG. 4 is a view showing a measured flow rate prior to correction $Q_{raw}$ and a corrected flow rate $Q_{offset}$ in a case where $SF_6$, which is the sample gas G, flows at a certain set flow rate 350 [sccm]. As is clear from FIG. 4, in a case where the flow rate correction is not conducted by the use of the primary side pressure $P_{in}$, when the primary side pressure $P_{in}$ is changed to decrease starting from the reference pressure $P_{base}$ 175 [kPag], a measurement error (% R.S) gradually increases toward positive (+). For example, in a case where the primary side pressure $P_{in}$ is 50 [kPag], the flow rate error is 0.8 [% R.S]. Meanwhile, in a case where the primary side pressure $P_{in}$ is changed to increase starting from the reference pressure $P_{base}$ 175 [kPag], the measurement error [% R.S] gradually increases toward negative (−). For example, in a case where the primary side pressure $P_{in}$ is 400 [kPag], the flow rate error is −1.7 [% R.S]. On the other hand, in a case where the flow rate is corrected by the use of the primary side pressure $P_{in}$, it turns out that the flow rate error falls within a range of ±0.1 [% R.S] even though the primary side pressure P changes from the reference pressure $P_{base}$.

<Effect of the First Embodiment>

With the mass flow meter 100 in accordance with this embodiment having the above-mentioned arrangement, since it is possible not only to decrease the measurement error of the flow rate $Q_{raw}$ resulting from a change of the primary side pressure $P_{in}$, much as possible but also to correct the measured flow rate $Q_{raw}$ with the isobaric specific heat $C_p$ of the sample gas G, a measurement accuracy of the flow rate of the mass flow meter 100 can be improved.

Second Embodiment

Figure 5:
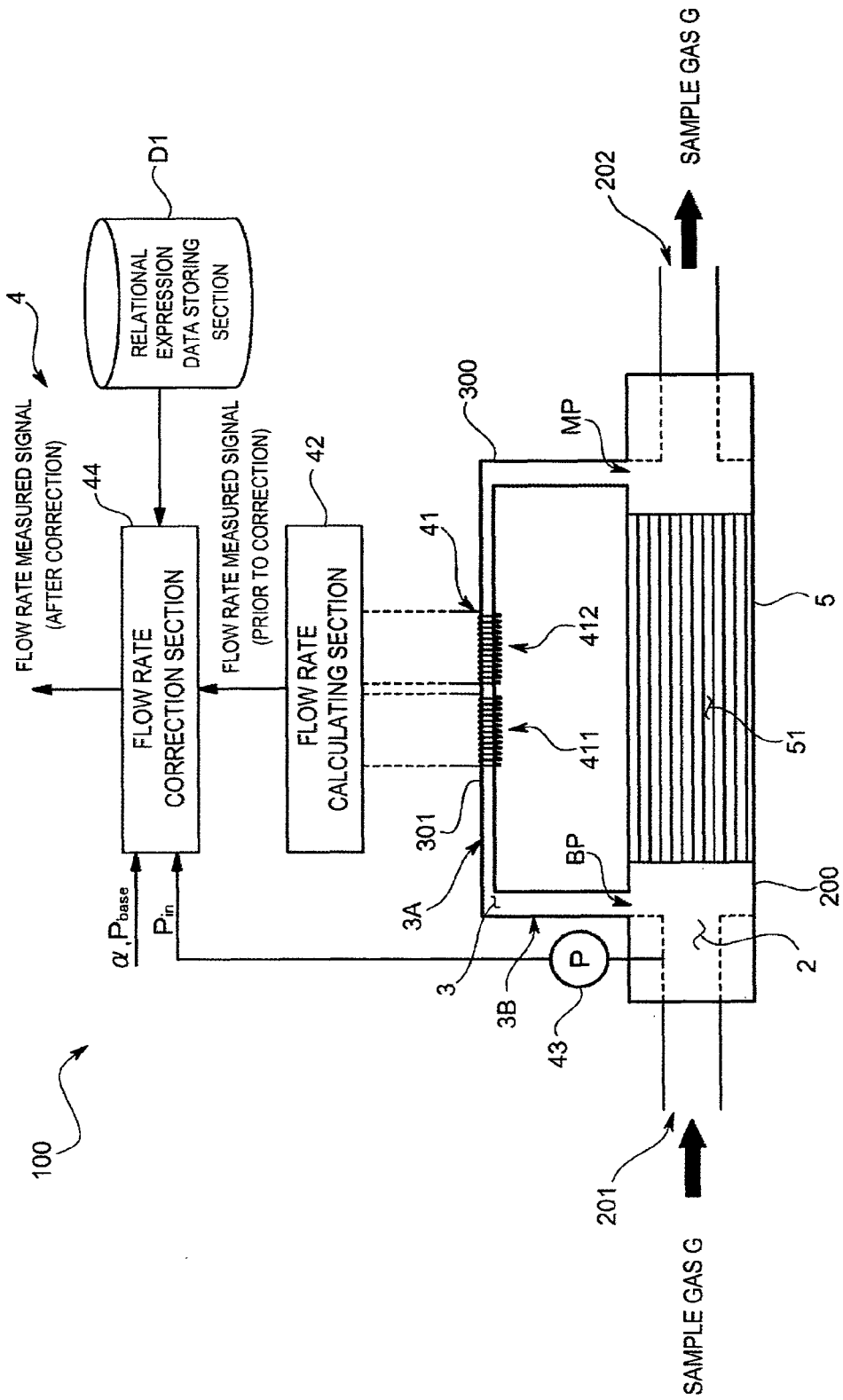
FIG. 5 is a pattern configuration diagram of a mass flow meter in accordance with a second embodiment of this invention.

Next, a second embodiment of the mass flow meter 100 in accordance with this invention will be explained. The mass flow meter 100 of this embodiment further comprises a relational expression data storing section D1 as shown in FIG. 5, and a function of the flow rate correcting section 44 differs from that of the first embodiment.

The relational expression data storing section D1 stores a relational expression data showing a relational expression of a coefficient a (a gradient a) and a coefficient b (an intercept b) to the gas physicality value in the following approximate expression (2) wherein the error [%] from the flow rate at the reference pressure $P_{base}$ is approximated by a predetermined function (a linear expression in this embodiment). The relational expression is input by a user in advance by means of an input device.

[Expression 4]

$$\text{Error}[\%] = a \times Q_{raw} + b \quad (2)$$

where, each of the gradient a and the intercept b depends on a kind of the sample gas G as far as a specification of the mass flow meter 100 is the same.

The gas physicality value is a value that shows a pressure influence of the molar isobaric specific heat $C_p$ of the kind of gas. The gas physicality value is a ratio between an inverse number of the molar isobaric specific heat $C_p$ at the reference pressure $P_{base}$ and a difference between an inverse number of the molar isobaric specific heat $C_p$ at the primary side pressure $P_{in(0)}$ (for example, 50 kPa)) in a case of obtaining the approximate expression and an inverse number of the molar isobaric specific heat $C_p$ at the reference pressure $P_{base}$. More concretely, $$\frac{\dfrac{1}{C_p(50\ \text{kPa})} - \dfrac{1}{C_p(175\ \text{kPa})}}{\dfrac{1}{C_p(175\ \text{kPa})}} \times 100 \quad \text{[Expression 5]}$$

A concrete method for obtaining a relational expression of the gradient a and the intercept b to the gas physicality value will be explained.

Figure 6:
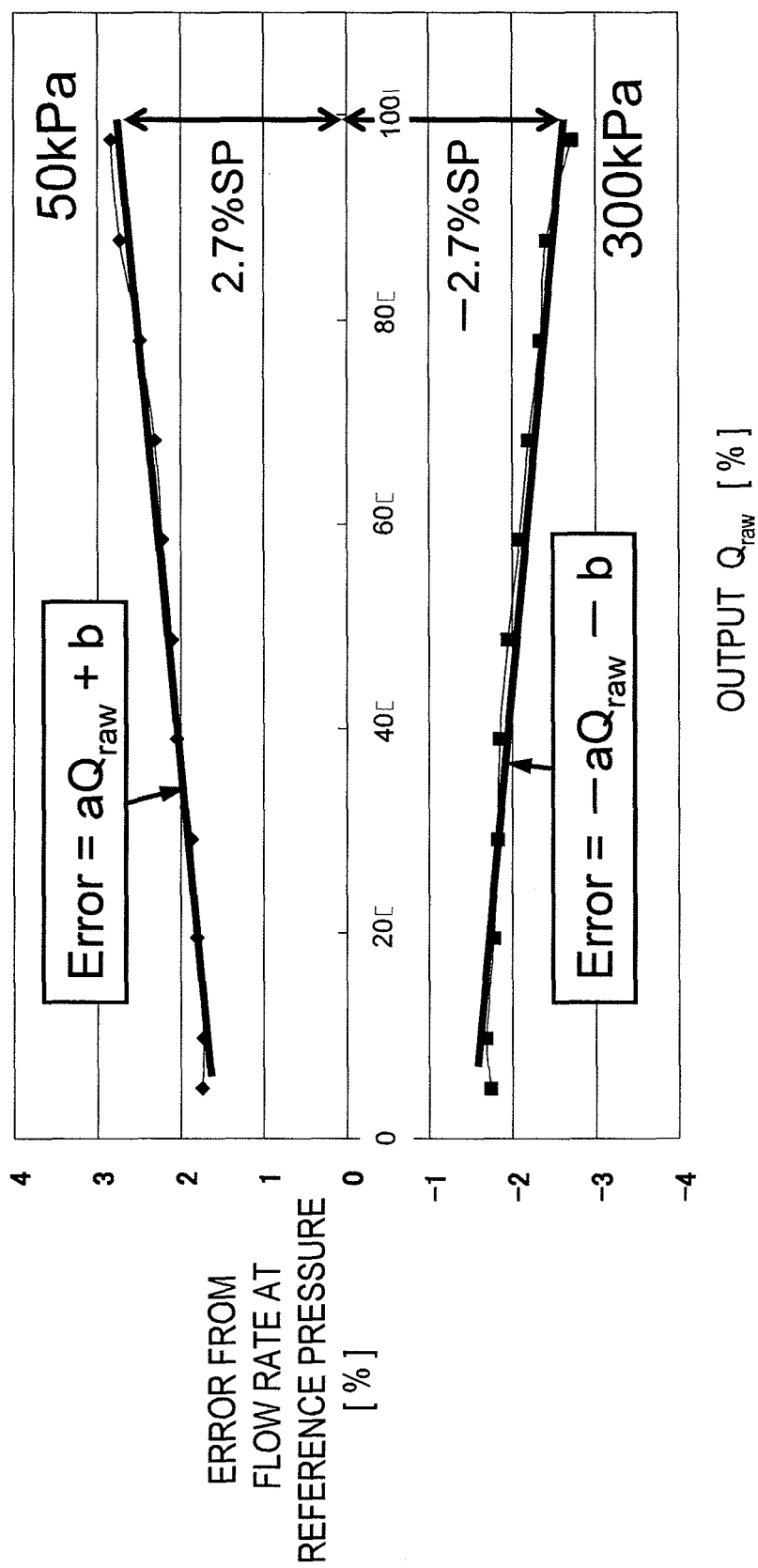
FIG. 6 is a view showing a deviation of the measured flow rate from the measured flow rate at a time of the reference pressure and its approximate expression.

An error [%] of the flow rate at the reference pressure $P_{base}$ is obtained actually by the use of multiple (three, in the embodiment) kinds of the gas for the mass flow meter 100 having a specification to which the correcting function is to be added. As shown in FIG. 6, the gradient a and the intercept b are obtained for each kind of the gas by approximating the error by the linear expression. FIG. 6 shows a view of the error [%] and its approximate expression for each pressure (50 kPa and 300 kPa) whose absolute value of the difference from the reference pressure $P_{base}$ (175 kPa) is equal.

Figure 7:
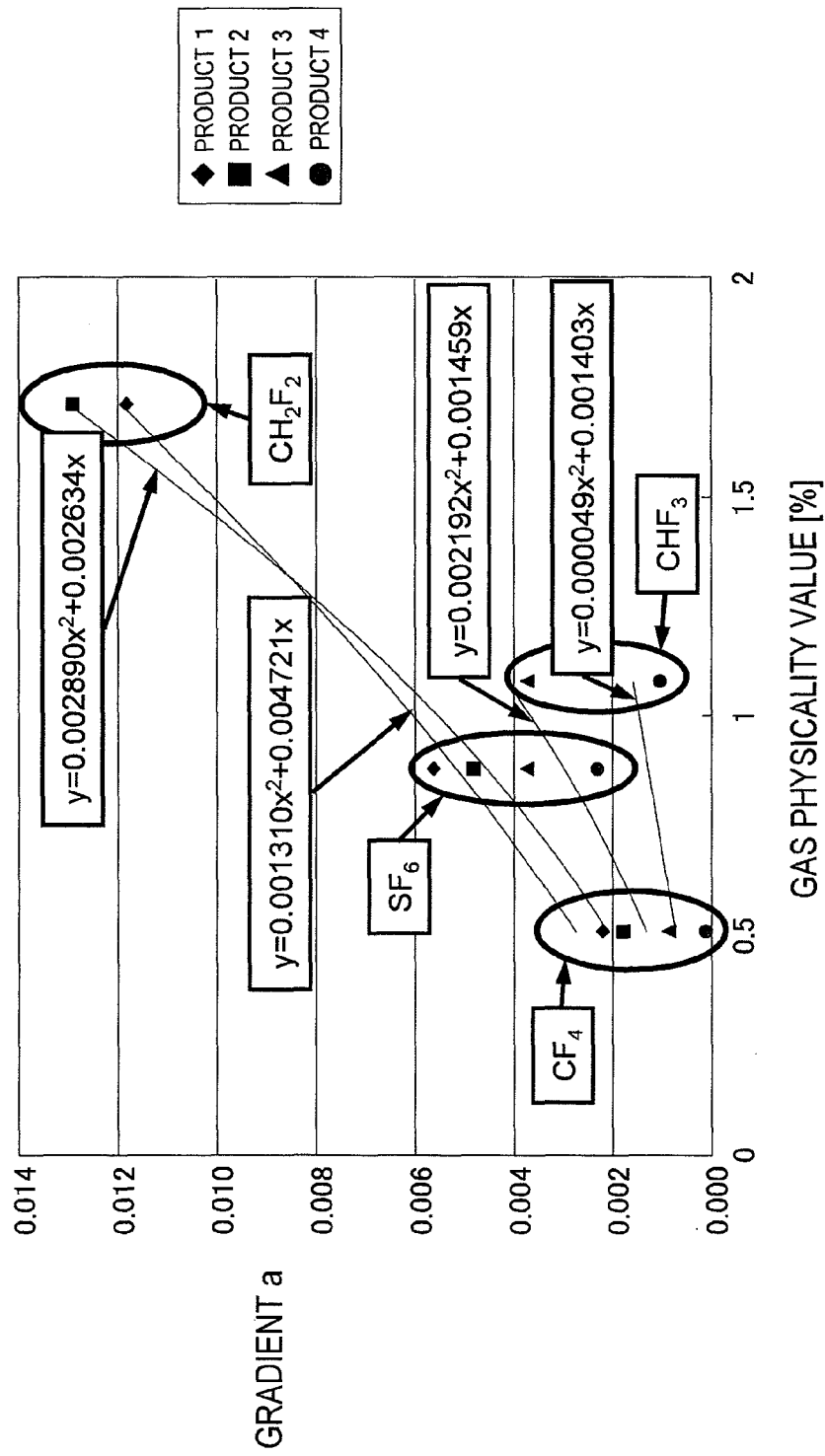
FIG. 7 is a view showing a gradient a to a gas physicality value for each of the products with different characteristics.

Later, as shown in FIG. 7, a gradient relational expression to the gas physicality value is obtained by means of the approximation by a predetermined relational expression (a quadratic expression, in this embodiment) with plotting a relationship between the gradient a and the gas physicality value with the gas physicality value (for example, 0~2) on a horizontal axis and the gradient a on a vertical axis. FIG. 7 shows a view wherein the gradient a is plotted at a time of obtaining the approximate expression of the error [%] by the use of $CF_4$, $SF_6$, $CHF_3$ and $CH_2F_2$ as the sample gas G. In addition, FIG. 7 shows the gradient relational expression obtained by using four different kinds of products, products 1~4.

Figure 8:
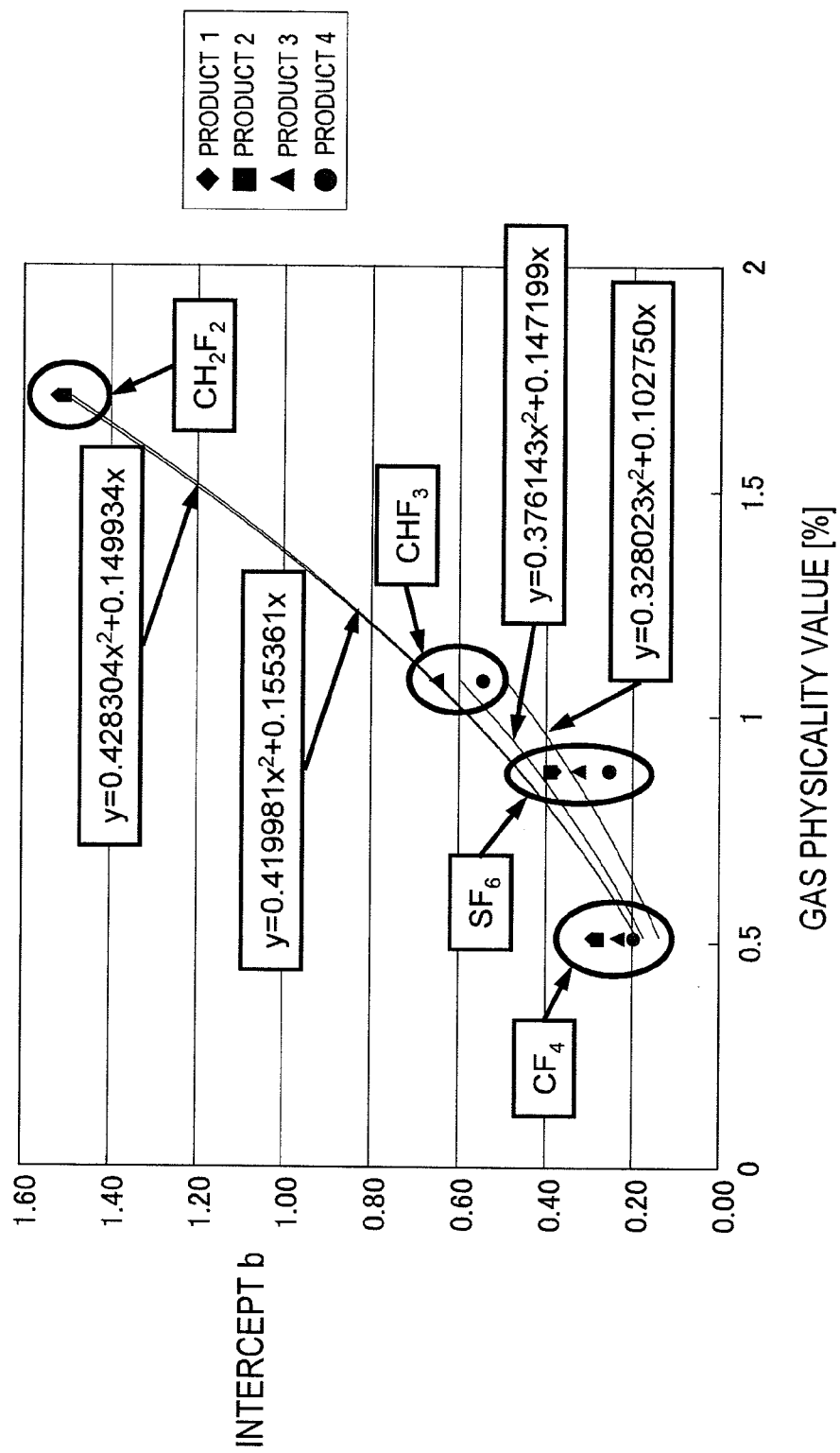
FIG. 8 is a view showing an intercept b to a gas physicality value for each of the products with different characteristics.

In addition, as shown in FIG. 8, an intercept relational expression to the gas physicality value is obtained by means of the approximation by a predetermined relational expression (a quadratic expression, in this embodiment) with plotting a relationship between the intercept b and the gas physicality value with the gas physicality value (for example, 0~2) on a horizontal axis and the intercept b on a vertical axis. Similar to FIG. 7, FIG. 8 also shows a view wherein the intercept b is plotted at a time of obtaining the approximate expression of the error [%] by the use of $CF_4$, $SF_6$, $CHF_3$ and $CH_2F_2$ as the sample gas G and shows the intercept relational expression obtained by using four different kinds of products 1~4.

A gradient relational expression data showing the gradient relational expression obtained as mentioned above and an intercept relational expression data showing the intercept relational expression obtained as mentioned above are stored in the relational expression data storing section D1. A pressure data showing the primary side pressure $P_{in(0)}$ at a time of making the gradient relational expression data and the intercept relational expression data is related to the gradient relational expression data and the intercept relational expression data.

As mentioned, in a case where a relational expression of the gradient a and a relational expression of the intercept b are obtained experimentally for three kinds of the gas, it is possible to obtain the constant a and the constant b corresponding to another kind of the gas from the above-mentioned expression by substituting the gas physicality value of the other kind of the gas so that the approximate expression (or the following expression for correction (3)) can be changed in accordance with the change of the kind of gas, by the use of the gas physicality value.

The flow rate correcting section 44 obtains the measured flow rate signal from the flow rate calculating section 42 and corrects and calculates its measured flow rate $Q_{raw}$ by the use of the following expression (3).

[Expression 6]

$$Q_{offset} = Q_{raw} \times \left[1 - \left\{(a \times Q_{raw} + b) \times \frac{P_{in} - P_{base}}{P_{in(0)} - P_{base}}\right\}\right] \quad (3)$$

where $P_{in}$ is the primary side pressure obtained by the pressure measuring section 43, $P_{base}$ is the previously determined reference pressure, a is a value calculated from the gas physicality value of the sample gas G and the gradient relational expression, b is a value calculated from the gas physicality value of the sample gas G and the intercept relational expression, and $P_{in(0)}$ is a primary side pressure at a time of making the gradient relational expression and the intercept relational expression. In relation with the first embodiment, the gas coefficient α in the above-mentioned embodiment is set as $(a \times Q_{raw} + b)/(P_{in(0)} - P_{base})$.

More specifically, the flow rate correcting section 44 corrects and calculates the measured flow rate $Q_{raw}$ by the use of the following expression (4).

[Expression 7]

$$Q_{offset} = Q_{raw} \times \left[1 - \left\{(a \times Q_{raw} + b) \times \frac{P_{in} - P_{base}}{\frac{\Delta P}{2}}\right\}\right] \quad (4)$$

where $\Delta P$ is a difference between two pressure values each of whose absolute value from the reference pressure $P_{base}$ is equal at a pressure at which the error approximation expression is made, and as a concrete example 300 [kPa]−50 [kPa]= 250 [kPa]. As mentioned, in this embodiment, attention is focused on the fact that the error approximation expressions appear symmetrically to the reference pressure $P_{base}$ (refer to FIG. 6) at the primary side pressure (300 kPa and 50 kPa in this embodiment) whose absolute value from the reference pressure $P_{base}$ is equal, both the approximate expression at a time of 300 kPa and the approximation expression at a time of 50 kPa are taken into consideration in order to improve the correction accuracy.

Next, an operation of the flow rate correcting section 44 will be explained.

The flow rate correcting section 44 obtains the measured flow rate data from the flow rate calculating section 42, obtains the gradient relational expression data and the intercept relational expression data from the relational expression data storing section D1 and obtains the primary side pressure $P_{in}$ from the pressure measuring section 43. Then the gradient a and the intercept b of the approximate expression of the sample gas G are calculated based on the gas physicality value of the sample gas G that has been input in advance. Later, the measured flow rate $Q_{raw}$ is corrected and calculated by the use of the above-mentioned correcting expression with the calculated gradient a, the calculated intercept b, the primary side pressure $P_{in}$, the reference pressure $P_{base}$ and the pressure $P_{in(0)}$ at a time of making the approximate expression, and then the corrected measured flow rate $Q_{offset}$ is output as an output signal.

Figure 9:
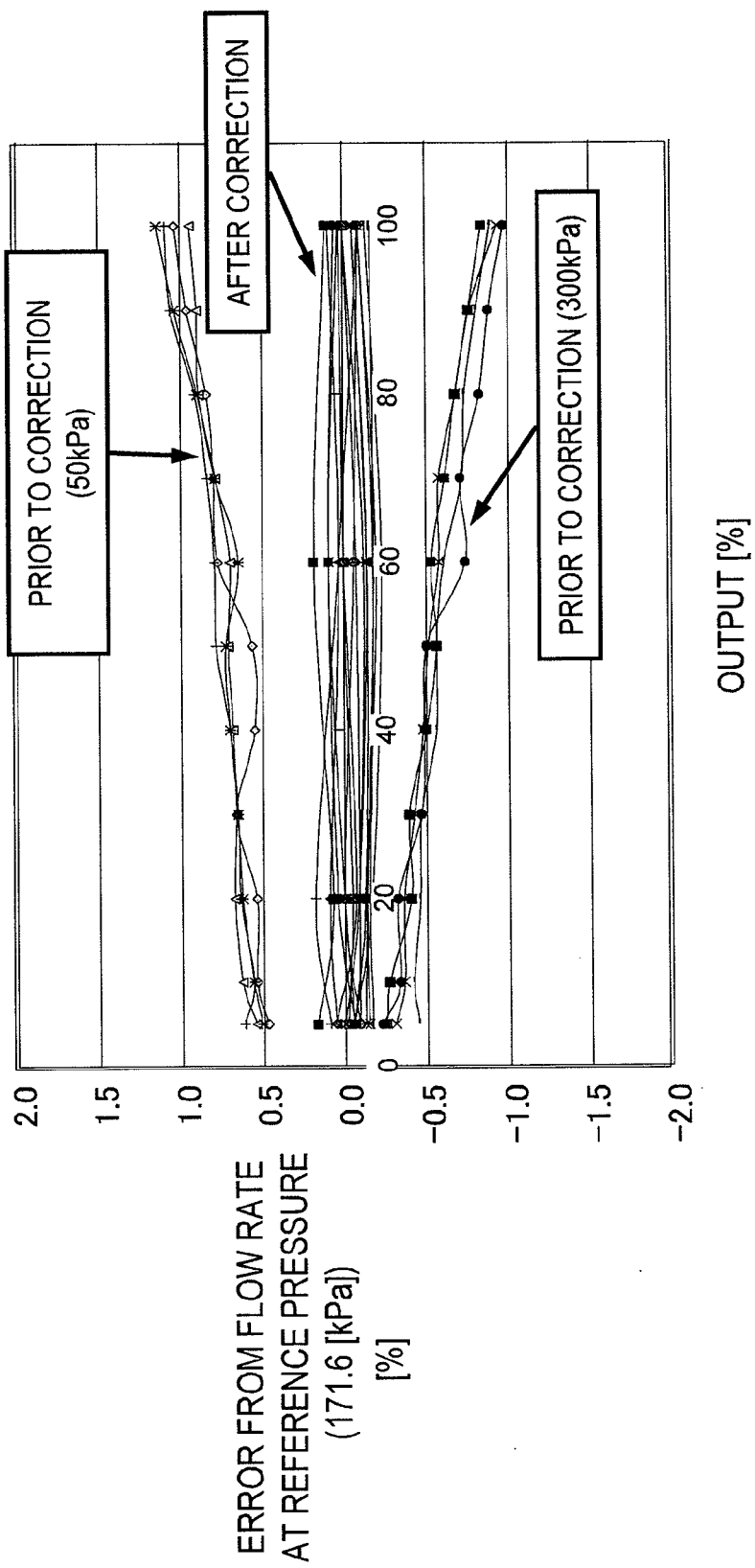
FIG. 9 is a view showing an error of the measured flow rate to a measured flow rate at a time of the reference pressure prior to and after correction in a case where a flow rate of $SF_6$ is measured by the use of the product 1.
Figure 10:
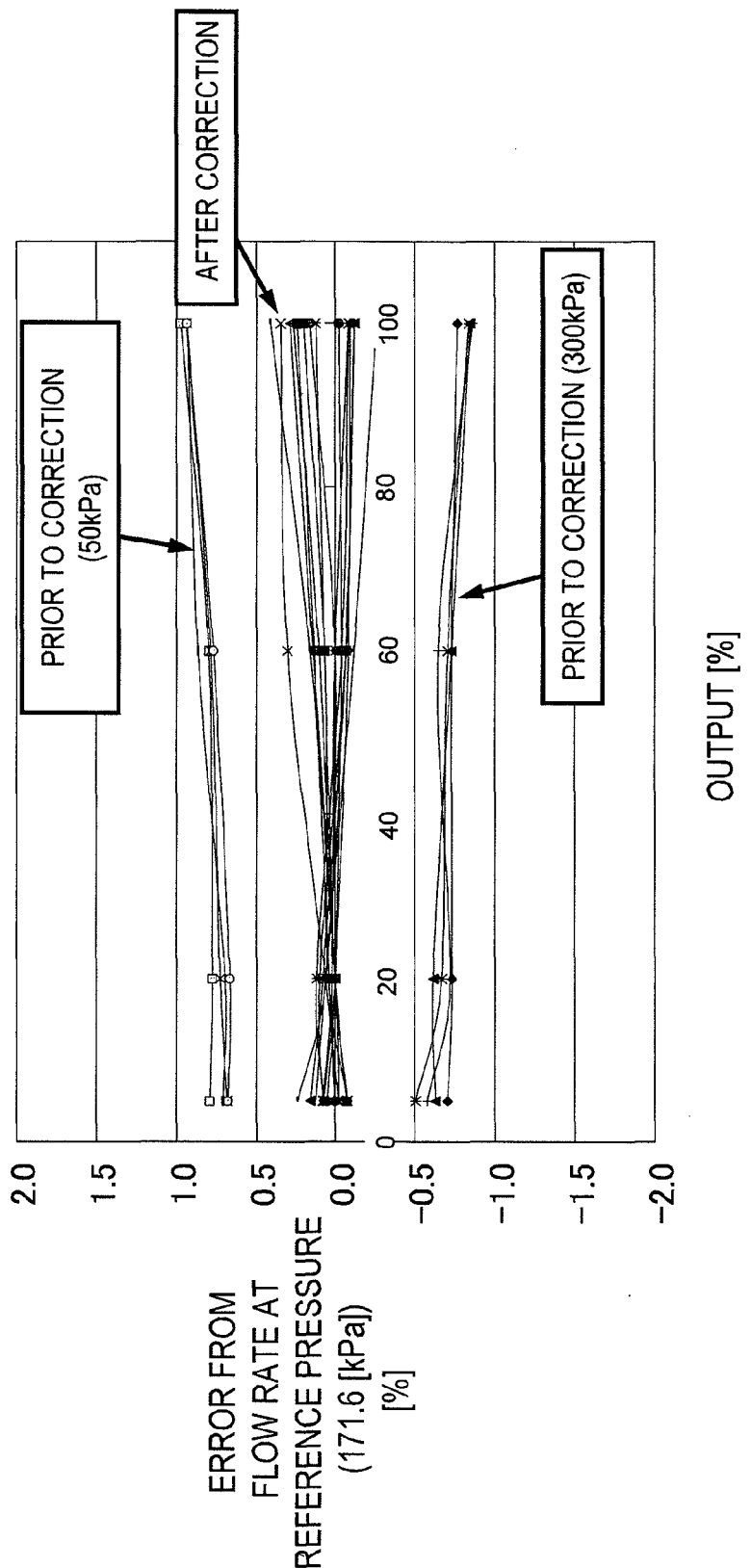
FIG. 10 is a view showing an error of the measured flow rate to a measured flow rate at a time of the reference pressure prior to and after correction in a case where a flow rate of $CO_2$ is measured by the use of the product 1.

Next, an experimental result in a case of using the mass flow meter 100 in accordance with this embodiment will be shown in FIG. 9 and FIG. 10. FIG. 9 is a view showing the measured flow rate prior to correction $Q_{raw}$ and the corrected measured flow rate $Q_{offset}$ of $SF_6$, being a kind of gas whose error [%] from the actual flow rate at the reference pressure $P_{base}$ and whose approximate expression is obtained by the use of the product 1. FIG. 10 is a view showing the measured flow rate prior to correction and the corrected measured flow rate of the $CO_2$ as being a kind of gas whose error [%] and approximate expression are not actually obtained and whose gradient a and intercept b are obtained by the gradient relational expression and the intercept relational expression. The reference pressure $P_{base}$ in FIG. 9 and FIG. 10 is 171.6 [kPa].

As is clear from FIG. 9 and FIG. 10, it turns out that the error decreases not only for the kind of gas actually used at a time of making the gradient relational expression and the intercept relational expression by obtaining the approximate expression, but also in a case where correction is conducted by the use of the gradient a and the intercept b obtained by substituting the gas physicality value in the gradient relational expression and the intercept relational expression. More specifically, since the error can be reduced even for the kind of gas whose approximate expression is not actually obtained, it is possible to reduce a burden of obtaining the approximate expression for every kind of gas.

Other Modified Embodiment

The present claimed invention is not limited to the above-mentioned embodiment. In the following explanation, the same code will be given to the component corresponding to the above-mentioned embodiment.

For example, the approximate expression of the error [%] is not limited to a linear expression and may be a polynomial (quadratic and over) expression. A function of the gradient a and the intercept b is not limited to a quadratic expression and the approximation may be conducted by a linear expression or a polynomial expression.

Figure 11:
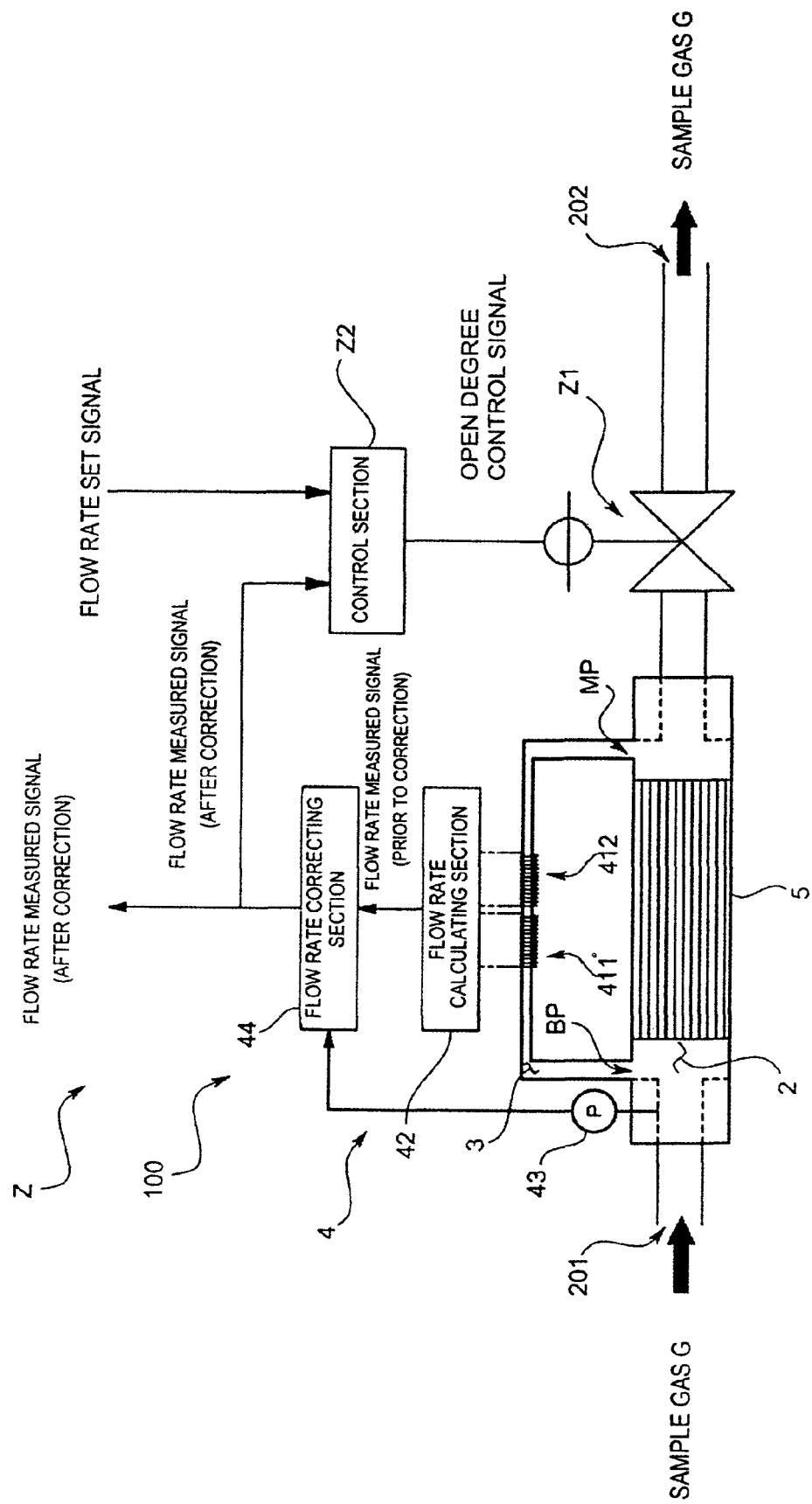
FIG. 11 is a pattern configuration diagram of a mass flow controller by the use of the mass flow meter of this invention.

A concrete embodiment of a mass flow controller Z into which the mass flow meter 100 of the first embodiment is incorporated comprises, for example, as shown in FIG. 11, the mass flow meter 100 of the above-mentioned embodiment, a flow rate control valve Z1 arranged at a downstream side of a meeting point MP in the main flow channel 2, a valve control section Z2 that controls the valve open degree of the flow rate control valve Z1 based on a signal value (a corrected measured flow rate $Q_{offset}$) shown by a corrected flow rate measured signal output by the mass flow meter 100 and a set flow rate value as being a target flow rate shown by a flow rate set signal input by an input device (not shown in drawings). The flow rate control valve Z1 may be arranged at an upstream side of the meeting point MP. The mass flow meter 100 in the second embodiment may be incorporated into the mass flow controller.

Furthermore, the thermal mass flow rate sensor of the above-mentioned embodiment can be applied not only to a constant current type but also to a constant temperature type.

In each of the above-mentioned embodiments, the primary side pressure $P_{in}$ is measured by the pressure sensor and the flow rate is corrected by the use of the pressure value that changes constantly. However, the flow rate may be corrected without using any pressure sensor by substituting a gas supply pressure that is used generally on a constant basis into the primary side pressure $P_{in}$ determined as a constant value. With this arrangement, for example, in a certain process since there is no chance that the gas supply pressure is changed largely at the primary side, the pressure fluctuates a little so that it can be applied to a case wherein it is understood that a value of the primary side pressure $P_{in}$ takes a substantially constant value. With this arrangement, since it is possible to correct the flow rate by generally reflecting the pressure difference from the pressure $P_{in(0)}$ at a time of making the approximate expression or the reference pressure $P_{base}$, the flow rate can be output with high accuracy. In addition, in this case, since the pressure sensor can be omitted, it is possible to reduce a cost by reducing a number of the components.

In each of the above-mentioned embodiments, the flow rate calculating section calculates the measured flow rate $Q_{raw}$ by the use of the voltage value of the thermosensitive resistive element and then the error resulting from the pressure fluctuation is corrected. However, it may be so arranged that an expression for calculating the measured flow rate used by the flow rate calculating section or an analytical curve is corrected by the use of the present primary side pressure and the reference pressure and the measured flow rate $Q_{raw}$ is calculated by the previously corrected expression. With this arrangement, similar to the above-mentioned embodiment, it is also possible to prevent the drop of the measurement accuracy due to the fluctuation of the primary side pressure.

The mass flow meter and the mass flow controller of the above-mentioned embodiment can be used for a semiconductor manufacturing process or a process other than the semiconductor manufacturing process.

In addition, a part or all of the above-mentioned embodiment or the modified embodiment may be appropriately combined, and it is a matter of course that the present claimed invention is not limited to the above-mentioned embodiment and may be variously modified without departing from a spirit of the invention.

REFERENCE CHARACTERS

100 . . . mass flow meter
G . . . sample gas
2 . . . main flow channel
3 . . . sensor flow channel
4 . . . flow rate detecting mechanism
411 . . . upstream side sensor section
412 . . . downstream side sensor section
41a . . . first thermosensitive resistive element
41b . . . second thermosensitive resistive element
42 . . . flow rate calculating section
43 . . . pressure measuring section
44 . . . flow rate correcting section
$P_{in}$ primary side pressure
α . . . gas coefficient
$Q_{raw}$ . . . measured flow rate
$P_{base}$ . . . reference pressure
$Q_{offset}$ . . . corrected flow rate

The invention claimed is:

1. A mass flow meter comprising:
a flow rate calculating section that obtains an output signal from a sensor section having a thermosensitive resistive element arranged in a flow channel where a sample gas flows, and that calculates a measured flow rate of the sample gas,
a pressure measuring section that measures a primary side pressure in the flow channel, and
a flow rate correcting section that corrects the measured flow rate obtained by the flow rate calculating section by the use of the primary side pressure obtained by the pressure measuring section and a gas coefficient determined by the sample gas, wherein
the flow rate correcting section calculates a corrected flow rate $Q_{offset}$ based on a following expression:

$$Q_{offset} = Q_{raw} \times \left[1 - \left\{(a \times Q_{raw} + b) \times \frac{P_{in} - P_{base}}{P_{in(0)} - P_{base}}\right\}\right] \quad \text{[Expression 8]}$$

where $P_{in}$, is the primary side pressure, $P_{base}$ is a previously set reference pressure, each of constant a and constant b is a value determined by a gas physicality value of the sample gas and the primary side pressure, and the $P_{in(0)}$ is a primary side pressure at a time when the constant a and the constant b are obtained.

2. A mass flow meter comprising:
a flow rate calculating section that obtains an output signal from a sensor section having a thermosensitive resistive element arranged in a flow channel where a sample gas flows, and that calculates a measured flow rate of the sample gas,
a pressure measuring section that measures a primary side pressure in the flow channel, and
a flow rate correcting section that corrects the measured flow rate obtained by the flow rate calculating section by the use of the primary side pressure obtained by the pressure measuring section, a gas coefficient determined by the sample gas, and a previously set reference pressure.

3. The mass flow meter described in claim 2, wherein the flow rate correcting section corrects the measured flow rate obtained by the flow rate calculating section by the use of the primary side pressure itself and the gas coefficient determined by the sample gas.

4. A mass flow meter comprising:
a flow rate calculating section that obtains an output signal from a sensor section having a thermosensitive resistive element arranged in a flow channel where a sample gas flows, and that calculates a measured flow rate of the sample gas,
a pressure measuring section that measures a primary side pressure in the flow channel, and
a flow rate correcting section that corrects the measured flow rate obtained by the flow rate calculating section by the use of the primary side pressure obtained by the pressure measuring section, a gas coefficient determined by the sample gas, and a previously set reference pressure, wherein the flow rate correcting section calculates a corrected flow rate $Q_{offset}$ based on a following Expression 9, where $P_{in}$ is the primary side pressure $P_{base}$ is the previously set reference pressure, α is the gas coefficient and $Q_{raw}$ is the measured flow rate:

$$Q_{offset} = Q_{raw} \times \{1 - (P_{base} - P_{in}) \times \alpha\} \quad \text{[Expression 9]}$$

5. A mass flow controller comprising:
the mass flow meter described in claim 1,
a flow rate control valve arranged in the flow channel, and
a valve controlling section that controls a valve open degree of the flow rate control valve based on the corrected flow rate obtained by the mass flow meter and a set flow rate value as being a target flow rate.

6. A mass flow controller comprising:
a mass flow meter including:
a flow rate calculating section that obtains an output signal from a sensor section having a thermosensitive resistive element arranged in a flow channel where a sample gas flows, and that calculates a measured flow rate of the sample gas,
a pressure measuring section that measures a primary side pressure in the flow channel, and
a flow rate correcting section that corrects the measured flow rate obtained by the flow rate calculating section by the use of the primary side pressure obtained by the pressure measuring section, a gas coefficient determined by the sample gas, and a previously set reference pressure,
a flow rate control valve arranged in the flow channel, and
a valve controlling section that controls a valve open degree of the flow rate control valve based on a corrected flow rate obtained by the mass flow meter and a set flow rate value as being a target flow rate.

* * * * *